United States Patent [19]
Krumweide et al.

[11] Patent Number: 5,803,402
[45] Date of Patent: Sep. 8, 1998

[54] SYSTEM AND METHOD FOR THE CONSTRUCTION OF SPACECRAFT STRUCTURES

[75] Inventors: Gary C. Krumweide; John Marks, both of Escondido; Chris Kingery, San Diego; John Richer, Carlsbad; William Converse, Fountain Valley, all of Calif.

[73] Assignee: Composite Optics, Inc., San Diego, Calif.

[21] Appl. No.: 645,136

[22] Filed: May 13, 1996

Related U.S. Application Data

[63] Continuation of Ser. No. 225,660, Apr. 11, 1994, abandoned.

[51] Int. Cl.$^6$ ........................................................ B64C 1/06
[52] U.S. Cl. ................................... 244/117 R; 244/158 R
[58] Field of Search ............................... 244/117 R, 119, 244/120, 158 R, 132, 131, 123; 220/4.28, 532, 651, 652

[56] References Cited

U.S. PATENT DOCUMENTS

| | | | |
|---|---|---|---|
| 4,397,434 | 8/1983 | Farnham | 244/158 R |
| 4,492,215 | 1/1985 | DiGianvittorio | 220/4.28 |
| 4,595,623 | 6/1986 | Du Pont et al. | 428/195 |
| 4,697,767 | 10/1987 | Witten et al. | 244/158 R |
| 4,807,802 | 2/1989 | Williams | 220/4.28 |
| 4,867,327 | 9/1989 | Roland | 220/4.28 |
| 4,875,795 | 10/1989 | Anderson | 244/123 |
| 4,945,488 | 7/1990 | Carver et al. | 244/117 R |
| 4,983,451 | 1/1991 | Sugino et al. | 422/283 |
| 5,086,997 | 2/1992 | Glass | 244/123 |

FOREIGN PATENT DOCUMENTS

| | | | |
|---|---|---|---|
| 1180303 | 10/1964 | Germany | 220/4.28 |
| 2753188 | 6/1978 | Germany | 244/158 R |

*Primary Examiner*—Galen L. Barefoot
*Attorney, Agent, or Firm*—Fulwider Patton Lee & Utecht, LLP

[57] ABSTRACT

A composite structure and method for constructing same for use in fabricating the framework of a spacecraft is disclosed. The structure is cut from flat sheets of composite laminate materials, and then assembled. The use of tenons and mortises provides for self-fixturing and adhesive bonding of the structural components.

29 Claims, 3 Drawing Sheets

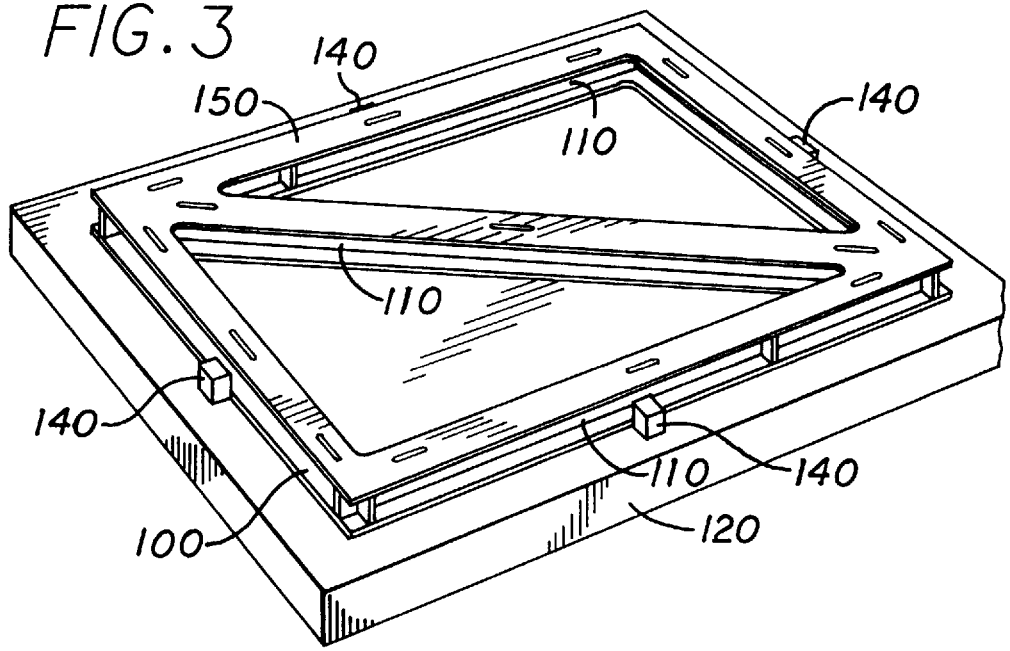
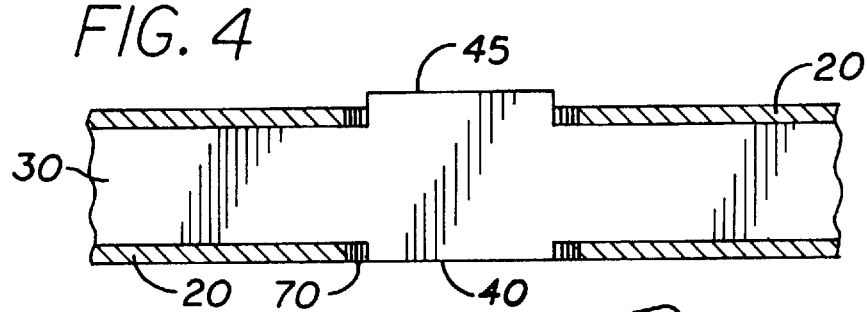
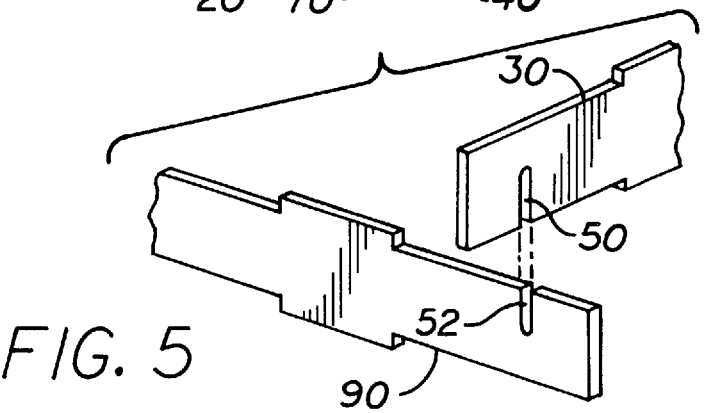

SYSTEM AND METHOD FOR THE CONSTRUCTION OF SPACECRAFT STRUCTURES

This application is a continuation, of application Ser. No. 08/225,660 filed Apr. 11, 1994, now abandoned.

BACKGROUND OF THE INVENTION

1. Field of the Invention

This invention relates generally to lightweight structures and methods of construction and more particularly to a novel system and construction method for constructing strong, lightweight, spacecraft structures from a composite material.

2. Description of the Related Art

Spacecraft structures require an unusual and difficult to achieve combination of low weight, structural stiffness, and thermal stability. Early structures were fabricated from metals such as aluminum or light alloys resulting in a relatively low cost but heavy structure. Since the overall weight of a spacecraft is constrained by the payload capabilities of a given launch vehicle, a relatively heavy structure resulted in a reduction of onboard equipment and instrumentation that could be included in the satellite. The emphasis, therefore is to make future spacecrafts lighter, faster and less expensive.

It is important that the satellite structure have sufficient structural strength and stiffness, since the satellite must be able to withstand forces imparted during launch, and much of the instrumentation carried on a satellite requires precise and unchanging alignment. A structure lacking high strength and stiffness, even if possessing low weight, may not survive the launch process. Additionally, structural members having a low modulus of rigidity may bend under the weight of the instrumentation during launch, causing a loss of alignment. Distortion of the structure may also occur once the spacecraft is in earth orbit due to the effects of inertia wheels and reaction thrusters used to alter the orientation and orbital dynamics of the spacecraft.

Thermal stability is another important parameter in spacecraft design, since the spacecraft is often exposed to extremes of temperature caused by the difference in heat load between the sunlit side and the shadow side of the spacecraft. The materials and construction methods used to construct the spacecraft must be capable of providing a structure that will not bend or distort under these different temperature loadings. Minuscule distortions sufficient to negatively affect critical alignment can occur that may render a scientific payload inoperable. Moreover, the trend to further lighten payloads by fabricating much of the payload hardware from composite materials has increased the need to achieve a better thermal match between the payload hardware and the spacecraft.

Spacecraft builders have recognized that properly fabricated structures of advanced composite materials can meet the aforementioned requirements. Structural systems have been used that include metallic tubes, epoxy/aluminum honeycomb, and other laminated structures. These materials produced lightweight structures, but such structures were often limited by a high coefficient of thermal expansion, lack of sufficient rigidity and/or high cost that are associated with bolted joints. Characteristically, tubular construction requires individual parts processing, testing, inspection, and assembly and is often not sufficiently thermally stable. Honeycomb construction requires increased fabrication time and has higher processing costs. An additional problem is that honeycomb construction needs to be vented or air trapped within the honeycomb matrix may delaminate the skin from the core when the honeycomb is exposed to rapid "pumpdown" as the spacecraft ascends.

From the above, it is evident that there is a need for a low cost method of producing spacecraft structural components that are strong, rigid, lightweight, and thermally stable to meet the rigors of space. The presently described invention fulfills this need.

SUMMARY OF THE INVENTION

The present invention provides a novel method of manufacturing a structural system for use on spacecraft that is both rigid and thermally stable. Additionally, the spacecraft structure and method of construction of the present invention is less costly and results in less waste than current construction methods.

The structural system of the present invention uses flat laminates of graphite fiber reinforced plastic composite materials. The use of flat laminate is advantageous over previous systems that use molded structural members, since CAD/CAM techniques can be used and layup of the flat laminate is less costly than comparable fabrication of a molded laminate structure.

The use of flat laminate sheets maximizes use of the expensive composite material by allowing a designer to lay out the structural components on a flat template using CAD/CAM techniques to minimize waste. Another advantage of the present invention is that once the layout of the individual parts is completed, the layout can be transferred to a computer controlled router, turret punch or waterjet cutter to inexpensively cut the parts from the flat laminate sheet.

The present invention incorporates features that allow modular structural units to be constructed and bonded together using adhesives. Because the individual structural pieces are cut from flat laminate sheets using CAD/CAM or computer controlled machining techniques, close dimensional tolerances are possible and therefore the individual pieces can be formed to facilitate self fixturing using integral tenons and mortises. Thus, the structural members can be assembled without costly jigs and alignment fixtures.

Because the individual components are modular in nature, spacecraft structures can be fabricated to fill a variety of needs. The modules can be attached to form shapes having a minimum of three sides up to any number of sides required by the designer. The unique construction of the present invention allows for adding structural components for attaching instrumentation as well as for attaching heat dissipating panels.

The present invention is embodied in a system and method whereby the components of a satellite are first laid out and then cut from a flat sheet of laminate. The components are provided with matching tenons and mortises which allow for efficient and inexpensive assembly and alignment of the structure. Once assembled, the components are adhesively bonded and room temperature cured to complete a three dimensional structure of light weight and high strength and rigidity. By use of the invention, assembly of a rigid, light weight and efficient spacecraft structure may be accomplished with relatively greater ease and less expenditure of labor that prior art spacecraft structures. An additional benefit of the present invention is that changes to payload configuration and routing of wiring harnesses are easily accomplished, as is the attachment of auxiliary structures.

These and other advantages of the invention will become more apparent from the following detailed description thereof when taken in conjunction with accompanying exemplary drawing.

BRIEF DESCRIPTION OF THE DRAWINGS

FIG. 3 is a perspective view depicting a final stage of assembly of an embodiment of the present invention.

FIG. 4 is a cross-sectional view depicting the self-fixturing feature of one embodiment of the present invention.

FIG. 5 is an exploded perspective view of another aspect of the self-fixturing feature of one embodiment of the present invention.

DETAILED DESCRIPTION OF THE PREFERRED EMBODIMENTS

It would be advantageous to provide a system for constructing spacecraft structures that takes advantage of composite material technology and computer controlled design and manufacturing techniques to produce a low cost, thermally stable spacecraft structure. The present invention provides these advantages.

Figure 1:
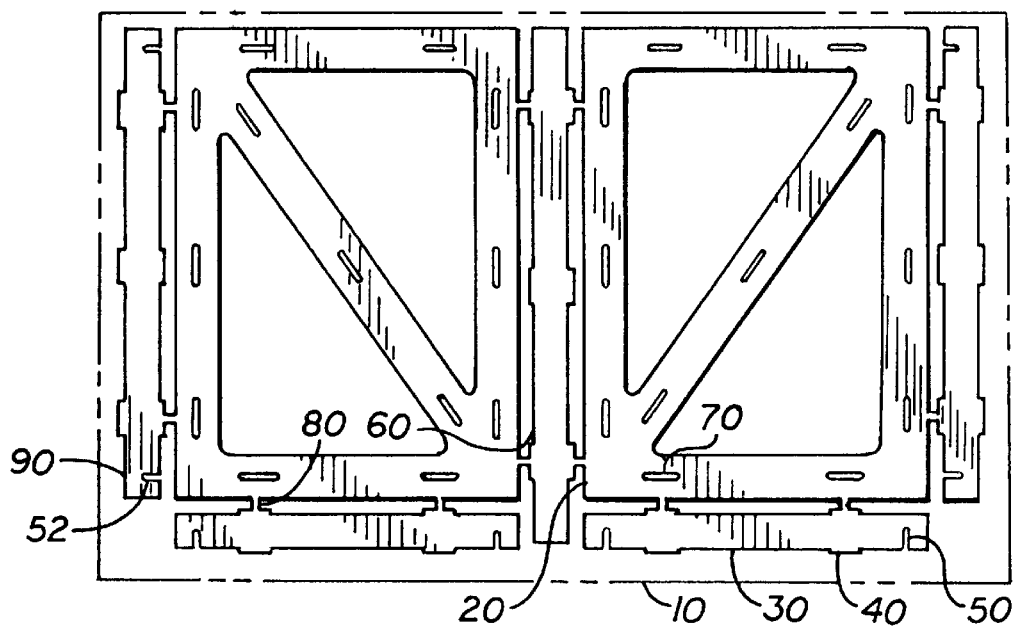
FIG. 1 is a plan view depicting a drawing plan of parts on a flat sheet of graphite fiber reinforced plastic laminate comprising one embodiment of the present invention.
Figure 2:
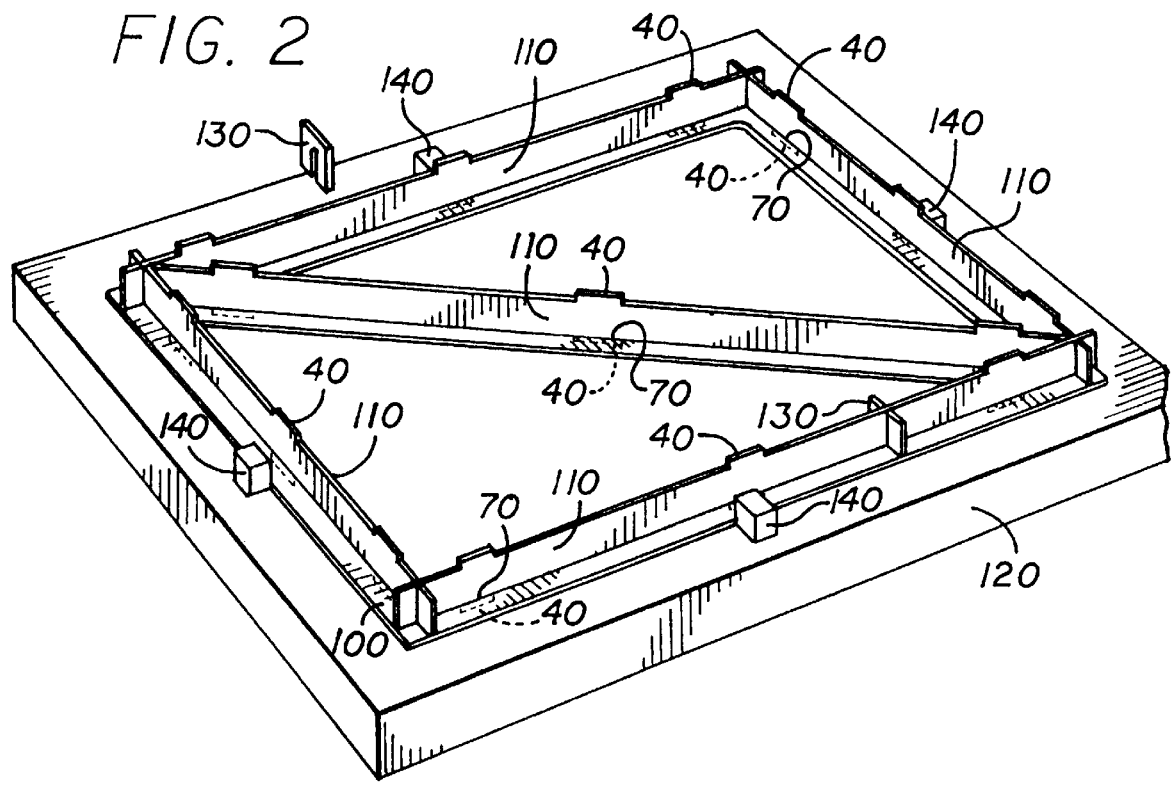
FIG. 2 is a perspective view depicting an intermediate step in the construction of one embodiment of the present invention.

One significant advantage provided by the present invention is that the majority of the individual parts that make up a spacecraft structure can be cut from flat laminate sheets. This results in significant cost reduction when compared to curved laminate parts that must be laid up on precision molds. FIG. 1 further illustrates how use of flat laminate sheetstock reduces cost by allowing the designer not to only reinforce the structure where reinforcement is needed, but also lay out the cutting plan to achieve maximum usage of the expensive composite laminate sheet.

FIG. 1 shows a drawing plan for a typical side panel of the present invention. In this view, all of the panels and ribs that make up one side panel of a spacecraft can be laid-out on a single sheet of graphite fiber reinforced plastic (GFRP) 10. The side panels typically take the form of trusses. The side panel illustrated in FIG. 1 is depicted for example purposes only. As will be seen in the following figures, the present invention readily lends itself to the construction of more complex trusses, as well as solid shapes with varying geometries.

Another key advantage of the present invention is that designs such as the drawing plan illustrated in FIG. 1 can be devised using computer assisted drawing software. This allows the designer to lay out the drawing plan for each flat laminate sheet to maximize use of the expensive composite laminate and to minimize waste.

In its simplest embodiment, a typical structural member of the present invention is comprised of two substantially identical panels between which is mounted one or more ribs. For example, the panel 20 will have mortises 70 located on its flat portions. These mortises 70 are specifically designed to receive the tenons 40 disposed on each rib. While a truss shaped embodiment is illustrated, it will be apparent that many embodiments of the present invention are possible. For example, one embodiment could be a simple I- or T-shaped structural beam. Additionally, each rib may have precisely located slots cut into each end that allow the rib to form an interlocking joint with a second rib. This feature allows several structural members to be connected together to form more complex structures. In an embodiment such as the truss shaped member shown in FIG. 1, or where the structural member is comprised of closed panels rather than an open truss, one or more additional ribs 60 may be positioned along a diagonal dimension to maximize structural strength and rigidity. Alternatively, the structural member may comprise only one panel 20 reinforced with one or more ribs. This embodiment provides a light weight rigid structure that also allows attachment of auxiliary structures or equipment to the structure.

When the designer is satisfied with the drawing plans, the design and cutting instructions may be passed to a computer assisted overhead router, punch press or laser. A waterjet overhead router is particularly advantageous as it allows for low cost, reliable and repeatable cutting of complex shapes. As can be seen from FIG. 1, the individual parts are connected using tabs 80 which remain after the rest of the unwanted material on flat sheet 10 is cut away. This allows the pieces for an entire structure to be stored as a single unit. When final construction of the unit is desired, the individual pieces are easily separated by either cutting or fracturing the tabs. This ensures that each side panel kit will have the appropriate number and construction of pieces, and that all the pieces match to facilitate rapid assembly.

After the individual pieces are separated from the flat sheet after cutting, the edges of the pieces are machined to eliminate the tabs 80. The pieces are then inspected and cleaned, and are ready for assembly to form the desired structural member. A primer can be applied, if necessary, to enhance performance of the adhesive system used to permanently affix the pieces to one another or to avoid microblasting the surface to increase adhesion between parts.

The tenons 40, mortises 70, and slots 52 cooperate to aid self-fixturing of the panel and ribs during assembly. This design allows an assembler to construct each panel without the need for complex and expensive fixturing. It also facilitates inspection of the assembly, as well as expediting any adjustments that must be made, since the panel can be assembled, inspected, and revised if necessary before the pieces are permanently affixed to each other with adhesive.

Construction of a typical truss shaped panel is illustrated in FIGS. 2–5. Assembly begins by placing a truss panel 100 on a granite table 120. Use of a granite table ensures that when completed, the panel will be flat and the sides will be parallel. The tenons 40 of the ribs 110 are then inserted into the mortises 70 of truss panel 100. FIG. 4 shows an enlarged view of the interaction between the tenons of the ribs and the mortises in each panel depicting two embodiments of the rib tenons. Tenon 45 can be cut long enough so that it protrudes from the mortise 70 in panel 20. This allows additional assemblies such as thermal cooling fins or equipment mounts to be attached to the protruding tenon 45. Alternatively, tenon 40 may be only long enough so that when assembled its tip is flush with the surface of panel 20.

To insure additional structural rigidity, the ribs have slots cut into their ends so that they interlock when assembled. As shown in FIG. 5, slot 50 in rib 30 fits into slot 52 on rib 90. Such an arrangement provides for self-reinforcement and self-fixturing.

Looking again to FIG. 2, assembly of the truss panel may also include the addition of stiffeners 130 using a slotted feature, like that shown in FIG. 5, as well as the use of spacing blocks 140. FIG. 3 shows how the completed truss panel 100 is brought together with outer truss laminate 150 to complete the assembly of the panel. Alternatively, outer truss laminate 150 could be omitted where called for by a particular application without compromising the structural integrity of the panel because of the interlocking feature of the ribs.

A principle advantage of the present invention is the ability to design custom complex and specialized structures comprised of modular, preformed structural members. The use of flat composite laminate allows the parts of the modular members to be designed and cut using computer assisted design and manufacturing techniques well known in the art. Use of such techniques also ensures that each part is fabricated to appropriately close tolerances to facilitate ease of assembly and self-fixturing. While the method of the present invention is particularly well suited to the fabrication of specialized, complex, custom designed structures, it is also applicable to mass production of modular structural elements. The method of the present invention provides the benefits of low cost, reproducibility, and high quality normally available only with high volume mass production. This is particularly advantageous in the design and fabrication of spacecraft, where mission profile and payload configuration often require customized structures. Alternatively, a designer can use an embodiment of the present invention comprising preformed modular structural members to design a structure that can be rapidly and relatively inexpensively assembled. The individual modular members, such as the truss shaped member previously described, are then assembled to form the structure. Structures may be constructed that comprise any number of sides greater than three, where each side is formed from one or more structural members of the present invention.

Figure 6:
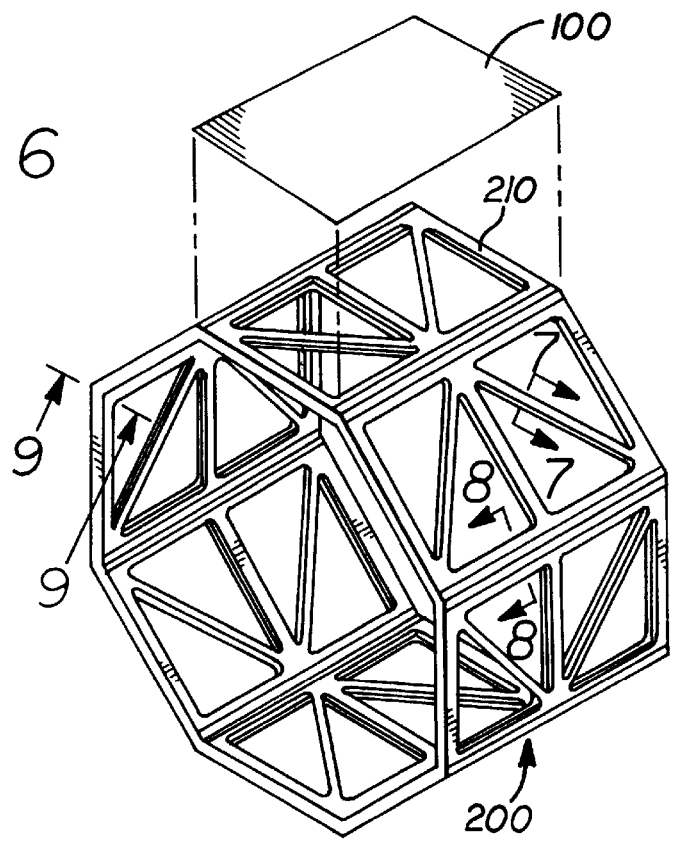
FIG. 6 is an perspective view of one possible arrangement of the present invention to form a spacecraft with eight sides.

One possible configuration that can be used in a spacecraft employing the present invention is depicted in FIG. 6. The spacecraft structure 200 is comprised of eight individual truss panels 210 assembled to form an octagonal structure. One additional feature of the present invention is that a surface skin 220 can be applied to either the internal surface or the external surface of structure 200 once assembly is complete. This provides for construction of a closed structure, while allowing ease of access and modification during assembly of the spacecraft. This panel can be monoque or a honeycomb sandwich. The panel also provides additional strengthening against shear and support for other spacecraft hardware, such as electrical boxes, solar panels, or other auxiliary equipment and instrumentation.

Figure 7:
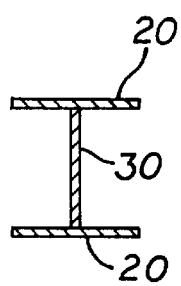
FIG. 7 is a cross-sectional view, taken along section line 7—7 in FIG. 6, depicting the arrangement between surface plates and ribs.

FIG. 7 is a cross-sectional view, taken along the line 7—7 of FIG. 6, depicting a cross-section of a typical truss member. This FIG. shows the orientation of rib 30 between truss plates 20.

Figure 8:
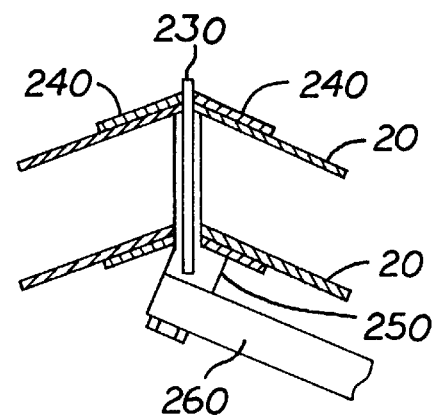
FIG. 8 is a cross-sectional view, taken along section line 8—8 of FIG. 6, depicting one possible corner arrangement of the present invention with attached mounting fixture.
Figure 9:
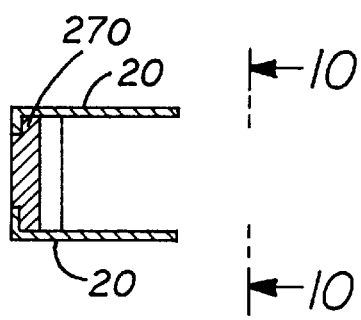
FIG. 9 is a cross-sectional view, taken along line 9—9 of FIG. 6, depicting the attachment of several panels.
Figure 10:
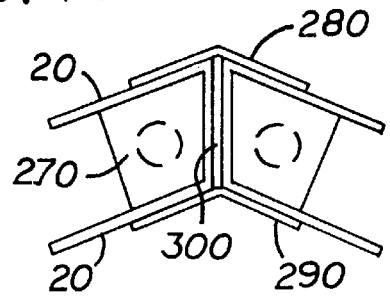
FIG. 10 is a cross-sectional view, taken along line 10—10 of FIG. 9, depicting an arrangement of fittings in a corner attachment of one embodiment of the invention.

FIGS. 8–10 show different embodiments for attachment of the panels 210 to form the structure 200. One embodiment of a configuration for the panel attachments is shown in FIG. 8. Angle clips 240 are attached to each longitudinal end of structure 210. A longeron or common rib, extending for the entire length of the junction, is mounted between the two panels. This longeron 230 can be slotted to fit over tenon connecting clips 240. As shown in FIG. 8 longeron 230 can be wider than the width of the junction between panels 210, allowing attachment of another panel or assembly to the protruding portion of the longeron. Also shown in FIG. 8 is an arrangement of a mounting bar 260 attached to a mounting clip 250. Mounting clip 250 attaches to the longeron 230. This arrangement allows auxiliary equipment and instrumentation to be attached to the spacecraft structure. Additionally, longeron 230 can be fabricated from a highly oriented GFRP to provide a thermally conductive path to facilitate cooling of the attached equipment or instrumentation.

FIG. 9 shows how corner fittings 270 are mounted between individual faces 20. FIG. 10 is a cross-sectional view taken along the lines 10–10 of FIG. 9 showing the corner fittings 270. Also shown is an embodiment of the longeron 300 wherein the width of the longeron is equal to the width of the joint between the panels 210. The external and internal joints may then be covered with an external splice 280 and an internal splice 290.

A particular advantage of using the design and materials discussed above is that this design provides for ease of assembly. Once the pieces are fitted together, they may be tacked in place using a capillary adhesives such as Hysol 956 or 9396, available from E. V. Roberts & Associates, Culver City, Calif. Alternatively, adhesive can be wicked to fill 100% of the faying surfaces between the joints. Once the unit is assembled, fillets can be formed on each side of the joint using a structural adhesive. This design and construction technique provides a structure that is mission adaptable, is low cost, and permits last minute changes to the structure with minimum difficulty or cost. Since the spacecraft can be made from a plurality of panels, and each panel's width can be tailored to the particular mission or launch vehicle involved, it will be apparent that the present invention lends itself to a wide range of possible sizes and configurations.

Other modifications can be made to the present invention by those skilled in the art without departing from the scope thereof. While several forms of the invention have been illustrated and described, it will also be apparent that various modifications can be made without departing from the spirit and scope of the invention. Accordingly, it is not intended that the invention be limited, except as by the appended claims.

We claim:

1. A structural member formed of multiple parts assembled together to form the structural member, the member comprising:

first and second ribs each having a rigid tenon disposed along a longitudinal edge of each said rib, each of said ribs also having a first end and a second end, said first end having a slot extending inwards from the longitudinal edge of the first rib, the slot being formed such that said slots of the first and second ribs removeably interlock;

a third rib having a rigid tenon disposed along a longitudinal edge of the third rib;

a flat plate having first, second and third mortises to receive the tenons of the first, second, and third ribs, respectively, the mortises being configured to receive the tenons such that each paired tenon and mortise form a friction fit so that the ribs and plate will remain temporarily assembled after the tenons have been inserted into the mortises, said third rib extending between said second ends of said first and second ribs to brace said first and second ribs and said flat plate; and adhesive means for permanently affixing the plate to the ribs.

2. The structural member of claim 1, wherein said flat plate and said ribs are formed of a composite material.

3. The structural member of claim 2, wherein said composite material is a graphite fiber reinforced plastic.

4. The structural member of claim 1, wherein said flat plate has a first surface and a second surface and each said tenon has a distal edge, wherein when each said tenon is inserted into each said mortise on said first surface, said tenon extends through said mortise.

5. The structural member of claim 4, wherein each said tenon is sized such that each said tenon, when inserted into said mortise on said first surface, protrudes from said second surface of said flat plate to allow attachment of another structural member or auxiliary piece of equipment to said tenons.

6. A truss shaped structural member for use in constructing a spacecraft, comprising:

a first rib having a rigid tenon disposed along a first longitudinal edge of the first rib, said rib also having a second longitudinal edge, a first end and a second end, said first end having a slot extending inwards from a longitudinal edge of the fist rib;

a second rib having a first and second end, said first end having a slot extending inwards from a longitudinal edge of the second rib, said slot being configured to removeably interlock with the slot of the first rib to join the first and second ribs;

a third rib having a rigid tenon disposed along a longitudinal edge of the rib;

a flat plate formed in the shape of a truss and having a mortise to receive the tenon of the first rib, the mortise configured to receive the tenon of the first rib such that the tenon and mortise form a loose friction fit so that the first rib and plate will remain temporarily assembled after the tenon has been inserted into the mortise, said third rib extending between said second ends of said first and second ribs to brace said first and second ribs and said flat plate; and adhesive means for permanently affixing the plate to the ribs.

7. The truss shaped structural member of claim 6, wherein said ribs and said flat truss shaped plate are comprised of a composite material.

8. The truss shaped structural member of claim 7, wherein said composite material is a graphite fiber reinforced plastic.

9. The truss shaped structural member of claim 7, wherein said second longitudinal edge of said first rib also has a rigid tenon disposed thereon, and further comprising a second flat plate formed in the shape of a truss and having a mortise to receive the tenon disposed on the second longitudinal edge of said first rib, the mortise configured to receive the tenon such that the tenon and mortise form a loose friction fit so that the rib and plate will remain temporarily assembled after the tenon has been inserted into the mortise.

10. The truss shaped member of claim 9, wherein said composite material is a graphite fiber reinforced plastic.

11. A method for fabricating a structural member for use in constructing the framework of a spacecraft, the method comprising:

assembling a plurality of structural members formed of composite material, each comprising first and second ribs each having a rigid tenon disposed along a longitudinal edge of each said rib, each of said ribs also having a first end and a second end, said first end having a slot extending inwards from the longitudinal edge of the first rib, the slot being formed such that said slots of the first and second ribs removeably interlock; a third rib having a rigid tenon disposed along a longitudinal edge of the third rib; a flat plate having first, second and third mortises to receive the tenons of the first, second, and third ribs, respectively, the mortises being configured to receive the tenons such that each paired tenon and mortise form a friction fit so that the ribs and plate will remain temporarily assembled after the tenons have been inserted into the mortises, said third rib extending between said second ends of said first and second ribs to brace said first and second ribs and said flat plate; and adhesive means for permanently affixing the plate to the ribs; and bonding said parts together with adhesive means for permanently affixing said parts to each other.

12. The method of claim 11, wherein said composite material is a graphite fiber reinforced plastic.

13. A method for constructing the framework of a spacecraft, the method comprising:

assembling a plurality of modular structural members each comprising first and second ribs each having a rigid tenon disposed along a longitudinal edge of each said rib, each of said ribs also having a first end and a second end, said first end having a slot extending inwards from the longitudinal edge of the first rib, the slot being formed such that said slots of the first and second ribs removeably interlock; a third rib having a rigid tenon disposed along a longitudinal edge of the third rib; a flat plate having first, second and third mortises to receive the tenons of the first, second, and third ribs, respectively, the mortises being configured to receive the tenons such that each paired tenon and mortise form a friction fit so that the ribs and plate will remain temporarily assembled after the tenons have been inserted into the mortises, said third rib extending between said second ends of said first and second ribs to brace said first and second ribs and said flat plate; and adhesive means for permanently affixing the plate to the ribs, by attaching said plates to said ribs by interlocking the slots disposed at the ends of said ribs to form one of said sides;

connecting the edges of said sides using joining means to temporarily affix said edges of said sides to one another to form said structure of said spacecraft wherein each pair of adjacent edges of said sides forms a joint;

applying an adhesive to each said joint for permanently affixing each said side to an adjacent side;

attaching fastening means for fastening equipment or radiating means to said structure; and attaching a skin to said structure.

14. The method of claim 13, wherein said composite material laminate is a graphite fiber reinforced plastic.

15. A spacecraft structure comprising at least three sides, each side comprising:

a modular structural member having at least three edges and further comprising:

a plurality of ribs, each rib having a first end and a second end, the first and second ends each having a slot extending inwards from a longitudinal edge of the rib, the slot being adapted to removeably interlock with the slot of another rib to form a rigid framework;

at least one plate mounted on the rigid framework; and a corner fitting mounted on at least one edge and adapted to be attached to the corner fitting of an adjacent modular structural member; and joining means for joining the corner fittings of adjacent modular structural members to each other to form the spacecraft structure.

16. The structure of claim 15 wherein the joining means further comprises:

a longeron disposed between a pair of corner fittings of adjacent modular structural members; and bonding means for affixing the pair of corner fittings to the longeron.

17. The structure of claim 16 wherein the bonding means comprises an adhesive.

18. The structure of claim 15 wherein the joining means comprises:

a clip having first and second ends, the first end having a first socket for receiving the corner fitting of a first modular structural member, the second end having a second socket for receiving the corner fitting of an adjacent modular structural member.

19. The structure of claim 18 wherein the clip includes a mounting surface for attaching additional equipment or structural members thereto.

20. The structure of claim 18 wherein the joining means comprises:

a longeron disposed between a the corner fitting of a first modular structural member and the corner fitting of an adjacent modular structure; and a clip having first and second ends, the first end having a first socket for receiving the corner fitting of the first modular structural member, the second end having a second socket for receiving the corner fitting of the adjacent modular structural member, the clip also having a slot located between the first and second ends, the slot being configured to receive the longeron.

21. The structure of claim 20 wherein the longeron has a width exceeding a width of the corner fittings of adjacent modular structural members such that the longeron extends beyond the width of the corner fittings.

22. The structure of claim 21 further comprising a mounting means for attaching additional equipment or structural members mounted to a portion of the longeron extending beyond the width of the corner fittings.

23. The structure of claim 15 further comprising:

a mounting bracket having a first end and a second end, the first end being disposed between the edges of the adjacent modular structural members whereby the mounting bracket is held in place by the joining means, the second end of the mounting bracket extending inwardly to provide an attachment point for mounting additional equipment or structural members thereto.

24. A method for constructing a spacecraft, the method comprising:

assembling a plurality of modular structural members each comprising first and second ribs each having a rigid tenon disposed along a longitudinal edge of each said rib, each of said ribs also having a first end and a second end, said first end having a slot extending inwards from the longitudinal edge of the first rib, the slot being formed such that said slots of the first and second ribs removeably interlock; a third rib having a rigid tenon disposed along a longitudinal edge of the third rib; a flat plate having first, second and third mortises to receive the tenons of the first, second, and third ribs, respectively, the mortises being configured to receive the tenons such that each paired tenon and mortise form a friction fit so that the ribs and plate will remain temporarily assembled after the tenons have been inserted into the mortises, said third rib extending between said second ends of said first and second ribs to brace said first and second ribs and said flat plate; and adhesive means for permanently affixing the plate to the ribs, by attaching said plates to said ribs by interlocking the slots disposed at the ends of said ribs to form one of said sides; and connecting the edges of said sides using joining means to affix said edges of said sides to one another to form said structure of said spacecraft.

25. The method of claim 24 wherein the step of connecting comprises:

joining the edges of the sides using clip means, the clip means having first and second ends, the first end having a first socket for receiving the edge of a first side and the second end having a second socket for receiving edge of an adjacent side.

26. The method of claim 25 wherein the step of joining further comprises:

placing a longeron between the edge of the first side and the edge of the adjacent side; and wherein the clip means further includes a slot for receiving the longeron.

27. The method of claim 24 further comprising the steps of:

applying an adhesive to each said side for permanently affixing each said side to an adjacent side;

attaching fastening means for fastening equipment or radiating means to said structure; and attaching a skin to said structure.

28. The method of claim 25 further comprising the steps of:

applying an adhesive between the edges of the first side and the adjacent side and the respective first and second sockets of the clip means for permanently affixing the first side to the adjacent side;

attaching fastening means for fastening equipment or radiating means to said structure; and attaching a skin to said structure.

29. The method of claim 26 further comprising the steps of:

applying an adhesive between the edges of the first side and the adjacent side and the respective first and second sockets of the clip means, and applying adhesive between the longeron and the slot of the clip means, for permanently affixing the first side, the longeron and the adjacent side to each other; and attaching fastening means for fastening equipment or radiating means to the longeron.

* * * * *